Jan. 24, 1928.

P. L. MENJOU 1,657,220

MOLD FOR SHAPING AND RETREADING TIRES WITH RUBBER

Filed Oct. 2, 1925  2 Sheets-Sheet 1

Inventor
Pierre Louis Menjou
by
Mock & Blum
Attorneys

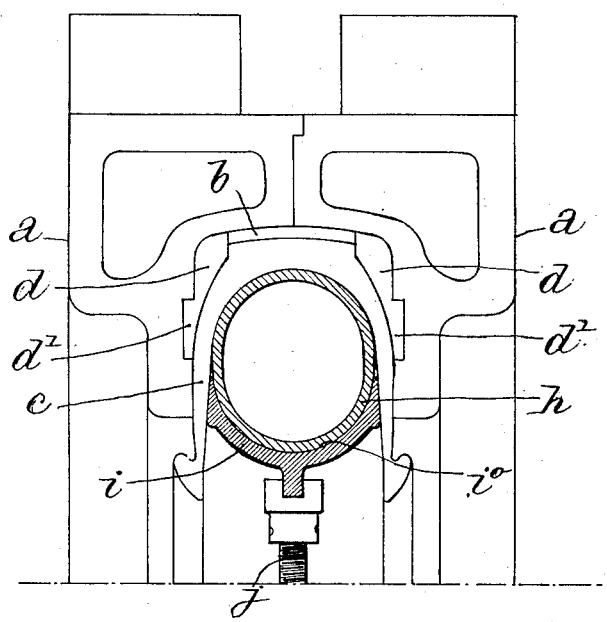
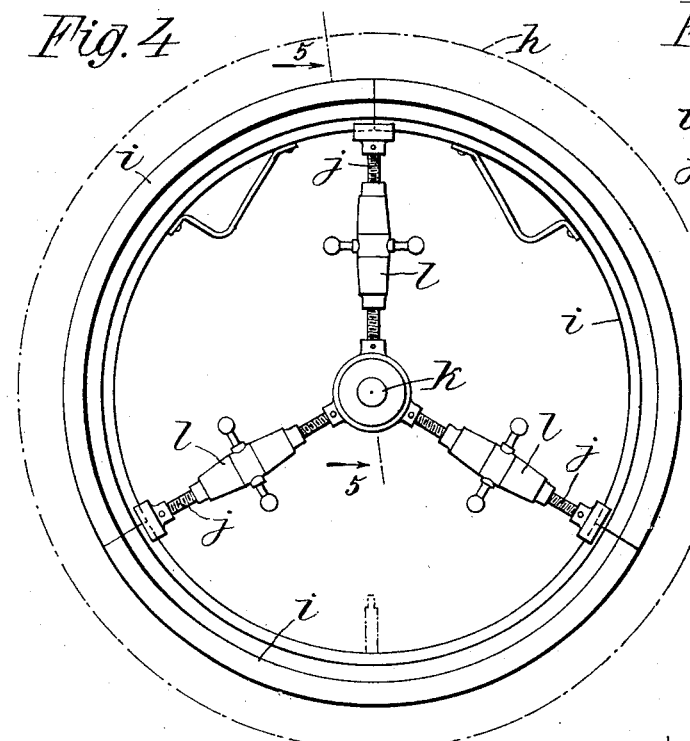
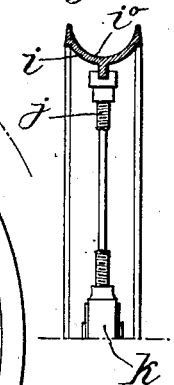

Patented Jan. 24, 1928.

1,657,220

UNITED STATES PATENT OFFICE.

PIERRE LOUIS MENJOU, OF PARIS, FRANCE.

MOLD FOR SHAPING AND RETREADING TIRES WITH RUBBER.

Application filed October 2, 1925, Serial No. 59,983, and in Belgium October 29, 1924.

This invention relates to improvements in molds for shaping and retreading tires with rubber and has for its main objects to provide means whereby tire molds may be readily prepared for shaping tires of any shape either with or without anti-splash devices formed integrally with the material of the cover and to provide said molds with better means for securing the mandrel therein.

The invention resides principally in making the molds of the type in question in such a way that they can be built up of members so that, according to whether some or other of said members are used, the profile of the part of the pneumatic tire cover to be shaped and covered with rubber, whether without anti-splash devices, or with circular anti-splash devices integral with said covers; and, in employing, for the purpose of constituting the means for securing the mandrel of the molds for shaping and coating the said pneumatic tire covers with rubber, an extensible crown which presses the said mandrel against said covers.

In the accompanying drawings, forming a part of the specification,

Figs. 1 and 2 of said drawings show, partly in radial section, a mold suitable for shaping and covering the covers of pneumatic tires with rubber or the like, and constructed according to the invention, the mandrel of said mold being assumed to be of any kind whatsoever.

Fig. 3 shows, in the same manner as Figs. 1 and 2, one of said molds provided with a mandrel provided with a securing device also constructed according to the invention.

Fig. 4 shows a side elevation of this securing device, and

Fig. 5 shows a section, along 5—5 of Fig. 4, of a portion of said securing device.

According to the invention, and more particularly according to those embodiments of its various parts which appear to be preferable for constructing a mold suitable for shaping and covering the covers of pneumatic tires with rubber or the like and of the kind in which the mandrel consists of a water bag (that is to say, an annular tube of rubber filled with water under pressure), the following, or analogous procedure is adopted.

In the first place, with regard to the parts for constructing the improved mold—except, on the one hand, the members to be added thereto in order to obtain the desired shaping, and on the other hand, the device for securing the water bag—they include, as usual, two heating plates $a$, between which is inserted the cover to be shaped and covered with rubber or the like, said plates being integrally connected together by any suitable means.

Figure 1:
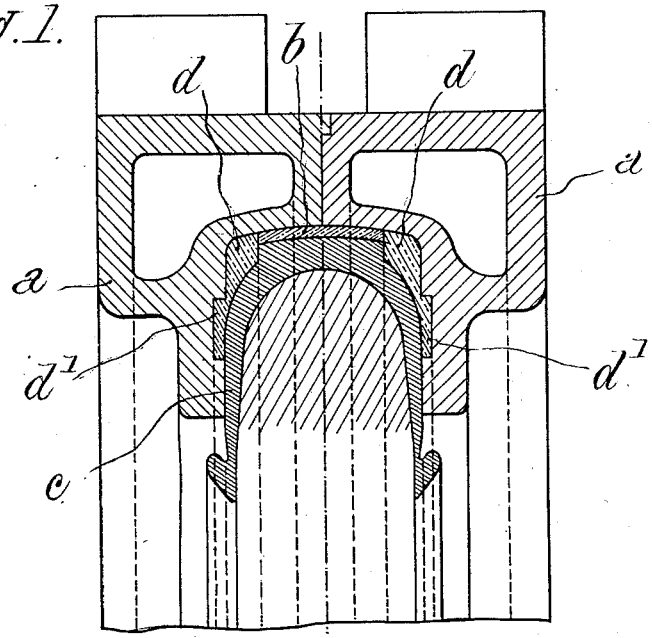

Next, with regard to the shaping and retreading of the tread of a cover $c$ of a pneumatic tire without any anti-splash device, the said shaping members, as shown in Fig. 1, comprise a circular member $b$, and two identical rings $d$, the internal faces of which are of such profile that, when placed in the mold on either side of the circular member $b$, they enable the lateral faces of said tread and the flanks of the cover to be produced simultaneously. Said rings $d$, moreover, are such that the outer face of each comprises a coaxial annular ridge $d'$ adapted to fit into a special circular groove provided in the corresponding heating plate $a$, so that the inner faces of the said rings fit tangentially against the inner faces of said plates.

Figure 2:
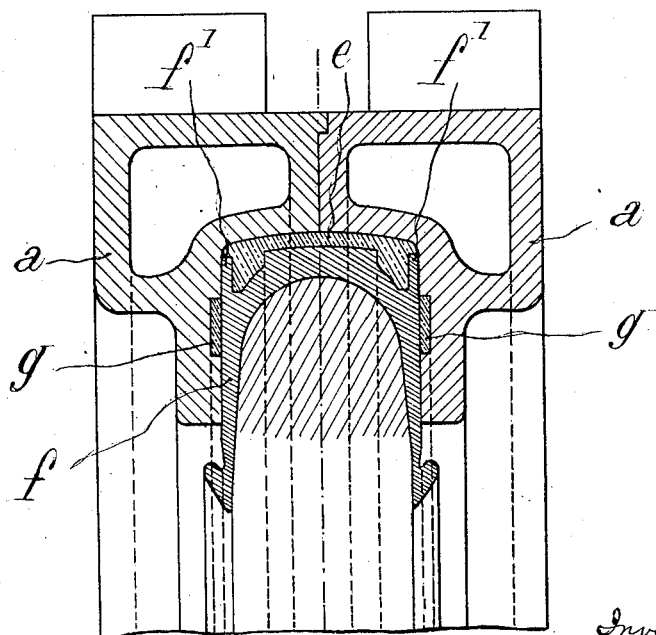

Alternatively said members may comprise, as shown in Fig. 2, a ring $e$, the inner face of which is of such profile that when inserted in the mold, it enables the cover $f$ of a pneumatic tire to be provided with two circular anti-splash devices $f'$ coaxially integral with said cover; and also of two rings $g$, adapted to fit respectively into the hereinbefore mentioned circular grooves on the heating plates $a$, without protruding from the inner faces of the plates $a$.

The circular member $b$, and particularly the rings $d$ and $g$ are made of such material as to present perfectly even and smooth surfaces to the surfaces to be shaped and covered with rubber or the like, in order to provide a good surface for the cover after repair.

Finally with regard to the device for securing the water bag $h$ within the mold—whatever profile is intended for the outer part of the cover—the device, as shown in Figs. 3 and 4, comprises a crown composed of arcuate members $i$, with radial ends, the points of connection of which correspond approximately to the apexes of a polygon (preferably regular) and at the interior of which is located the axis of the crown. Said crown is such that, when placed in position in the mold, its plane of symmetry coincides with the plane of symmetry of the tire cover, and is provided with a peripheral groove $i^0$ of radial section in the form of a continuous and regular curve, similar, for example, to that of the rims of bicycles, the outer side edges of which groove are preferably inclined so as to fit, as completely as possible, the inner faces of the flanks of the cover, thus enabling the water bag to fit closely against it when once charged and placed in position, and the crown, in turn, bears laterally against the inner faces of said flanks. The crown is made of strong, and preferably light material, such as aluminum or the like.

The water bag securing device also comprises as many arms $j$ as there are crown members $i$. The said arms $j$ are disposed radially, their inner ends preferably being connected to a member $k$ coaxial with the crown, and their outer ends bearing against the inner face of said crown at the points of junction of said crown members, so as to produce a uniform pressure. For this purpose each of the said arms $j$ are composed, for example, of two rods, with opposite threads, with a turnbuckle $l$ or the like The outer ends of each arm are formed in such a way that they can engage with the said crown members $i$.

In the operation of my improved mold, the tire cover $c$ to be shaped and covered with rubber or the like is inserted in one of the plates $a$; the water bag $h$ is inserted in the cover; the crown members $i$ are arranged end to end and the arms $j$ are assembled to attach said members together in the position as shown in Fig. 3. The arms are operated in such a way as to tend to force said crown members apart, which fixes them securely in position, the second plate is laid over the first and the two are pressed together, and the requisite degree of pressure is applied to the water in the water bag $h$. This latter, finding a resistant and rigid support against the crown, bears very closely both against the crown and the cover, without risk of being pinched or punctured.

The detaching of the securing device from the water bag $h$, and the removal of the bag itself and the tire cover, are effected in reversed order. The separation of the arms $j$ from the crown when in position in the mold, and also the placing of same in position, will be facilitated if, for example, as shown in Figs. 4 and 5, said arms are articulated at their point of junction, to the member $k$ by means of axes parallel to the axis of the crown, and if the mutual embedding of said arms and crown is arranged so that said arms are adapted to oscillate on their respective axes of articulation.

As the result, a mold is obtained which, according as the members $b$ and $d$, or the members $e$ and $g$, are added thereto, enables on the one hand the covers of pneumatic tires to be shaped and covered with rubber or the like, either without any anti-splash device, or with circular anti-splash devices integral with said covers, and on the other hand, prevents the crown members $i$ from tending to slip, inasmuch as their ends being perfectly supported, by means of relatively large surfaces, on the extremities of the arms $j$. Further as hereinbefore explained the water bag is held perfectly in its normal position by means of its securing device, during the shaping and rubbering of the cover.

As is self-evident, and also follows from the foregoing, the invention is in no wise restricted to the embodiments of its members more particularly described above, but on the contrary, comprises all modifications, especially that in which the arms $j$, instead of being composed as described or similarly, would be constructed in such a way as to be adapted to act under the influence of a compressed fluid or the pressure of a liquid.

What I claim as new and desire to secure by Letters Patent is:—

1. In a device of the class described a mold comprising in combination a pair of frame members having recesses in their walls, said frame members abutting each other along a junction line, tire shaping members engaging in said recesses, a tread shaping member arranged to fit over the line of junction of the frame members, an annular core member and means operable to simultaneously support said core member and to clamp a tire in the mold.

2. In a device for covering and shaping rubber tires, means for accurately positioning an internal pressure exerting member within the mold comprising an annular ring, composed of a plurality of arcuate members and provided with a strengthening rib on its inner face.

3. A device for covering and shaping rubber pneumatic tires comprising in combination a mold consisting of heating plates and removable tire shaping members, a water bag and means whereby the water bag or like is accurately positioned within the mold, comprising an annular ring, the surface of which contacting with the water bag is concave in section and the outer surfaces of which are slightly inclined in order to press the edges of a tire, placed within the mold, against the mold.

4. A device for covering and shaping rubber pneumatic tires comprising in combination a mold consisting of heating plates and removable tire shaping members, a water bag and means whereby the water bag is accurately positioned within the mold comprising an annular ring composed of a plurality of arcuate members and provided with a strengthening rib on its inner face and extensible radial arms, provided at their outer ends with heads provided with grooves adapted to engage with the said strengthening ribs.

5. A device of the class described comprising in combination, frame members forming part of the walls of a mold, a core member, and a core supporting and tire clamping member having a peripheral core supporting surface and lateral tire clamping surfaces forming acute angles with the core supporting surface.

6. A device of the class described comprising in combination frame members forming part of the walls of a mold, a core member, and a core supporting and tire clamping member having a core supporting surface in the form of a peripheral groove and conical tire clamping surfaces.

In testimony whereof I have hereunto set my hand.

PIERRE LOUIS MENJOU.